United States Patent [19]

Peerlkamp

[11] Patent Number: 4,945,152

[45] Date of Patent: Jul. 31, 1990

[54] MOLDED NYLON 4.6 ARTICLE HAVING FIRST AND SECOND ENTHALPY

[75] Inventor: Erik R. Peerlkamp, Born, Netherlands

[73] Assignee: Stamicarbon B.V., Geleen, Netherlands

[21] Appl. No.: 237,711

[22] Filed: Aug. 29, 1988

Related U.S. Application Data

[63] Continuation of Ser. No. 111,062, Oct. 22, 1987, abandoned.

[30] Foreign Application Priority Data

Nov. 20, 1986 [NL] Netherlands .................. 8602947
Mar. 28, 1988 [EP] European Pat. Off. ........ 88200584.6

[51] Int. Cl.$^5$ .............................................. C08G 69/46
[52] U.S. Cl. ...................... 528/335; 264/85; 264/234; 264/235; 264/331.19; 264/345; 264/346; 528/481; 528/483

[58] Field of Search ......................................... 528/335

[56] References Cited

U.S. PATENT DOCUMENTS 4,757,131 7/1988 Bongers et al. .................. 528/335

Primary Examiner—Harold D. Anderson
Attorney, Agent, or Firm—Cushman, Darby & Cushman

[57] ABSTRACT

The invention provides molded polyamide articles and a process for making the same. The molded polyamide articles consist substantially of tetramethylene adipamide units, the articles having an increased crystallinity expressed as a first melting enthalpy which is at least 30 Joules per gram higher than a second melting enthalpy determined after subsequent solidification of the polyamide. The process comprises shaping the polyamide from the melt, cooling the resulting polyamide article, and heat treating the article in an inert gas atmosphere at a temperature of 220° C. for 0.25 to 24 hours.

7 Claims, 1 Drawing Sheet

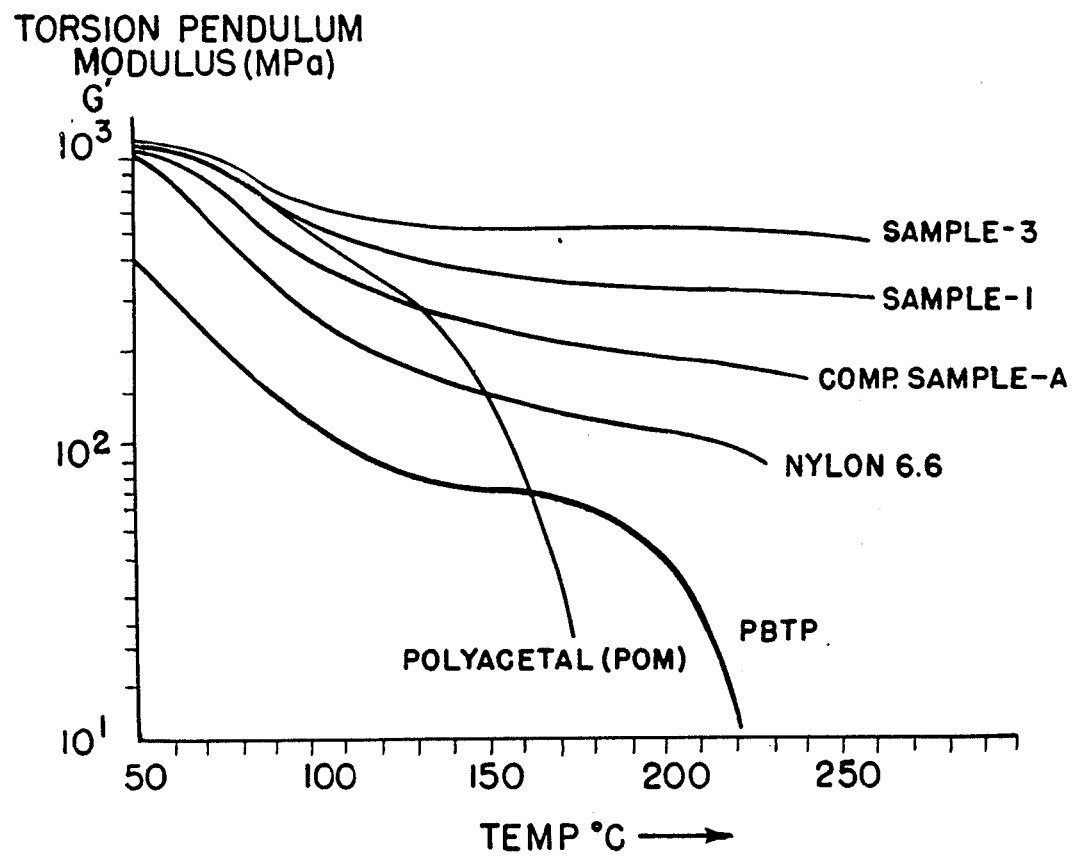

MOLDED NYLON 4.6 ARTICLE HAVING FIRST AND SECOND ENTHALPY

This is a continuation of application Ser. No. 07/111,062 filed Oct. 22, 1987 now abandoned, the entire contents of which are incorporated herein by reference.

FIELD OF THE INVENTION

The invention relates to molded polyamide articles consisting substantially of tetramethylene adipamide units with improved properties.

BACKGROUND OF THE INVENTION

Molded polyamide articles consisting substantially of tetramethylene adipamide units (nylon 4.6) are known from U.S. Pat. No. 4,446,304. These molded polyamide articles show superior properties over molded articles consisting of polycaprolactam (nylon 6) or polyhexamethylene adipamide (nylon 6.6), especially with respect to mechanical properties at elevated temperatures and impact resistance at low temperatures. However, the molded polyamide articles of U.S. Pat. No. 4,446,304 fail to meet the requirements for some applications for molded articles, especially high temperature applications.

SUMMARY OF THE INVENTION

An object of the present invention is to provide molded polyamide articles consisting substantially of tetramethylene adipamide units with improved properties. A further object of the invention is to provide a process for the production of these molded articles.

These and other objectives are accomplished by the present invention which provides molded polyamide articles consisting substantially of tetramethylene adipamide units which show superior properties.

The molded polyamide article consisting substantially of tetramethylene adipamide units according to the invention is characterized by an increased crystallinity of the polyamide expressed as a first melting enthalpy which is at least 30 Joules per gram (J/g) higher than the second melting enthalpy determined after subsequent solidification of the polyamide. The first melting enthalpy is determined on a sample of the molded article by Differential Scanning Calorimetry (DSC) with a heating rate of 5° C./min., and the second melting enthalpy is determined after the molten sample has been cooled at a rate of 5° C./min. to below its crystallization temperature and, after complete solidification, is reheated at a heating rate of 5° C./min.

Preferably, the first melting enthalpy is at least 45 J/g higher than the second melting enthalpy, even more preferably the difference is at least 60 J/g.

During the DSC measurement, a further condensation of the polyamide may occur, which may interfere with the determination of the melting enthalpy. Therefore, the samples should be contained in a closed pressure vessel in which the condensation process and evaporation of water produced by the polycondensation process are suppressed, otherwise the values obtained for the melting enthalpies are too high. Even so, after-condensation during the DSC measurement may affect the value of $\Delta H_m$ for low molecular weight samples ($\eta_{rel}$ < about 2.5), and therefore corrections should be made.

A molded article is defined as an article that has been shaped from the molten state, for example by injection molding, melt-extrusion, pressing or casting and does not include the manufacture of filaments and films. The molded article according to this invention, as will be appreciated from the context herein, is the product of the final molding operation from the molten state, and does not include, for instance, granules, chips, tablets, pellets, and similar unfinished products, however, produced, for use as feed to such a molding operation.

The molecular weight of the polyamide is expressed as its relative viscosity, $\eta_{rel}$, measured in a solution of 1 g polyamide in 100 ml 96 wt. % sulfuric acid at 25° C. The molecular weight may vary between wide ranges, for instance $2.0 < \eta_{rel} < 8$, and is merely determined by practical considerations such as minimum melt viscosity necessary for molding.

The polyamide should consist substantially of tetramethylene adipamide units, i.e., at least 50%, preferably at least 80%. A high content of copolymer units generally is not recommended because in that case the polyamide shows a more amorphous character, which results in a lower absolute level for the improved properties. However, if isomorphous groups, for example, isophthalic and or polybutyleneterephthalic acid are introduced, higher content of copolymer may be acceptable. Copolymer units can for instance be polyamide-forming units, for instance dicarboxylic acid groups, diamines and lactams, imide-forming and ester-forming groups.

The polyamide may contain additives, for example, stabilizers, flame retardants, reinforcing filler materials for example inorganic or organic fibers, mold release agents, colorants, pigments and other polymers.

Molded articles comprising the polyamide according to the invention possess very high mechanical properties, low creep, low water adsorption, better oxidative stability and environmental stress cracking resistance compared to the molded polytetramethylene articles according to the prior art.

Gaymans, "Integration of Fundamental Polymer Science and Technology," *Proceedings of an International Meeting on Polymer Science and Technology*, Ed. L. A. Kleintjes and P. J. Lemstra, The Netherlands, 14–18 April, 1985, (Elsevier Appl. Sc. Publ. New York, London 1987), pages 573–76, shows examples of filaments and films of polyamide 4.6 that possess a high first melting enthalpy. From SAXS (small angle x-ray scattering) Gaymans concludes that crystallite growth is the reason for the increase in crystallinity. However, increased crystallinity through crystallite growth has a very negative effect on impact resistance of polyamide articles and will lead to brittleness. This is clearly shown by T. J. Bessell et al., *Journal of Materials Science* 1137–1136 (1975) (see for example FIG. 4 in which the toughness of polyamide 6 decreases dramatically if the crystallinity increases by only 10%.).

Very surprisingly, it has been found that the molded polyamide articles with increased crystallinity according to the present invention exhibit very acceptable impact resistance. Even with an increase of crystallinity of about 70 J/g, the Izod impact resistance remains about 7 J/m², which is still an improvement over the impact resistance of other polyamides such as nylon 6.6 and 6. The torsion pendulum modulus at elevated temperature increases more than two-fold with respect to articles according to the prior art as, for example, described in U.S. Pat. No. 4,446,304.

The method for producing the molded polyamide articles according to the present invention is to heat treat articles of molded and solidified polyamide at a temperature below the melting point of the polyamide.

More specifically, the method for producing molded polyamide articles according to the invention comprises shaping the polyamide from the melt to form a molded polyamide article, cooling the molded polyamide article to below its melting point, and heat treating the molded polyamide article in an inert gas atmosphere at a temperature of between 220° C. to 290° C. (below the melting temperature of the polyamide).

Heat treatment at temperatures below 220° C. is not useful because it takes too long for any effect of the treatment to become observable, whereas heat treatment at temperatures above the melting point of the polyamide may result in deformation of the article. Preferably, the temperature is chosen between 240° and 275° C.

The polyamide articles can be shaped from the melt by any method, for example, injection molding, extrusion, pressing or casting.

The duration of the heat treatment may vary within wide limits and depends, inter alia, on the molding conditions, the dimensions of the article and the temperature of the heat treatment. For practical reasons, the duration of the heat treatment will usually be limited to 24 hours, whereas a heat treatment of less than ¼ of an hour is usually not very effective. The required length of the heat treatment can be considerably shortened if the article is cooled from the melt at a rate of at least 40° C. per minute, preferably at least 100° C. per minute. Applying a hydrostatic pressure may further lessen the required duration of the heat treatment.

As a side effect, the molecular weight of the polyamide may increase during the heat treatment. It will be shown, however, that the increase of molecular weight has only minor influence on the unexpected improvement of the properties of the polyamide.

The heat treatment according to the invention should not be confused with the heating at increased temperatures to relieve stress in the molded articles. Stress-relieving heat treatment is described in, for example, U.S. Pat. Nos. 3,504,077 and 4,455,417. The temperatures at which such heating takes place are generally considerably lower than heat treatment according to the process of the present invention. For polyamides such as nylon 6 and 6.6, these temperatures are generally less than about 180° C.

It may be advantageous to subject the molded article to the heat treatment according to the invention immediately after it has been molded and before it has been cooled completely, so that little additional heat is needed to bring the article to the required temperatures. The heat treatment is preferably carried out in an inert gas atmosphere that may contain a substantial concentration of water vapor, for example, up to 50% by volume.

A further advantage of the molded polyamide articles according to the invention is that they exhibit improved homogeneity. Differences in molecular weight, as measured by the relative viscosity, between the polyamide at the periphery of the molded article and at the core of the molded article are minimized. As a result, the mechanical properties of the molded polyamide articles according to the invention are uniform throughout the article. This is especially observed in thick-walled articles. Due to quenching in injection molding, however, the surface layer of the treated articles may possess a very high crystallinity, which is a further unexpected advantage of the molded articles of the present invention.

BRIEF DESCRIPTION OF THE DRAWINGS

The FIGURE shows the torsion pendulum modulus of various test bars of nylon 4.6 (polytetramemethylene adipamide) (samples 1 and 3 and comparative sample A) and nylon 6.6, PBTB (polybutyleneterephthalamide, e.g., Arnite T of AKZO, the Netherlands) and POM (polyacetal, e.g. Delrin 500N010 of Dupont, USA) as a function of temperature. These samples are further described in Example IV.

DETAILED DESCRIPTION OF THE INVENTION

The invention is further elucidated by the following examples without, however, being limited thereto. If not otherwise indicated, the following test methods have been used.

a. Determination of first and second melting enthalpy: Differential Scanning Calorimetry, (DSC), in a DSC2 of Perkin and Elmer on samples of about 8 mg in a closed pressure vessel. Heating and cooling rate 5° C./minute over a temperature range between 30° and 315° C.

b. Determination of melting points: peak temperatures from DSC as described under a.

c. Relative viscosity, $\eta_{rel}$, on a solution of 1.0 gram in 100 ml 96 wt. % sulfuric acid at 25° C.

d. Torsion pendulum modulus G' at frequency 0.2153 Hz with a heating rate of 1° C./minute.

e. Impact resistance IZOD ASTM 256.

Example I

Test bars with dimensions (13×65×3 mm³) were injection molded, using STANYL ® a nylon 4.6 produced by DSM at Geleen, the Netherlands, having a relative viscosity $\eta_{rel}=3.56$. The injection molding temperature was about 315° C., the temperature of the mold being 60° C.

The bars were subjected to a heat treatment at 260° C. and atmospheric pressure in a nitrogen atmosphere containing 12 vol. % water vapor.

The properties of the bars were determined at different time intervals and are shown in Table 1.

TABLE 1

| Duration of Heat Treatment (hours) | $\eta_{rel}$ | $\Delta H_{m1}$ (J/g) | $\Delta H_{m2}$ (J/g) |
|---|---|---|---|
| 0 | 3.34 | 79 | 82 |
| 4 | 3.95 | 127 | 84 |
| 20 | 4.55 | 154 | 83 |

Example II and Comparative Example II

A bar of nylon 4.6 with a diameter of 8 cm was produced by means of extrusion.

STANYL, nylon 4.6 with a $\eta_{rel}=3.8$, manufactured by DSM at Geleen the Netherlands, was used to produce the bar.

The relative viscosities were determined at the core and the periphery of the bar which was produced by the usual methods:

periphery:      $\eta_{rel} = 3.4$

-continued

| core: | $\eta_{rel} = 3.8$. |

Immediately after the extrusion process, the bar was subjected to heat treatment at 265° C. in a nitrogen atmosphere containing 10 vol. % water. Subsequently, the relative viscosity of the core and the periphery were determined:

| periphery: | $\eta_{rel} = 3.8$ |
| core: | $\eta_{rel} = 3.9$ |

Example III and Comparative Example III

Nylon 4.6 with a relative viscosity, $\eta_{rel}$, of 2.4 was mixed with 70 wt. % clay (based on the total amount of nylon and clay) in an extruder and then pelletized. The pellets were fed into an injection molding machine and injection molded to form thin-walled electric plugs. These plugs were very brittle and could be easily crushed. The relative viscosity, $\eta_{rel}$, of the polyamide in the plugs was 2.3 (Comp. Ex. IIIA).

The plugs were subsequently subjected to heat treatment, immediately after injection, for 45 minutes at 260° C. in a nitrogen atmosphere containing 10 vol. % water. After heat treatment, the plugs exhibited good mechanical properties and no brittleness. The relative viscosity, $\eta_{rel}$, of the nylon 4.6 increased to 2.9. The first melting enthalpy (DSC) was 128 J/g. (Ex. III).

When nylon 4.6 with $\eta_{rel}$ of 3.4 was used instead of that with a $\eta_{rel}$ of 2.4, a much higher pressure was required to completely fill the mold when injection the plug, and the resulting plug showed discoloration. The $\eta_{rel}$ of the polyamide in the plug is 2.9 after injection molding without heat treatment. The first melting enthalpy was 96 J/g (Comp. Ex. IIIB). The properties of the test plugs are shown in Table 2.

TABLE 2

|  | starting material $\eta_{rel}$ | heat treatment | final product |  |  |
|---|---|---|---|---|---|
|  |  |  | $\eta_{rel}$ | first melting enthalpy | remarks |
| Ex. III | 2.4 | 0.75 hrs | 2.9 | 128 J/g | good mech. properties; |
| Comp. Ex. IIIA | 2.4 | 0 hrs | 2.3 |  | low mech. properties |
| Comp. Ex. IIIB | 3.4 | 0 hrs | 2.9 | 96 J/g | difficult to mold; discoloration |

Example IV

Test bars were injection molded from STANYL TW300 ®, a medium flow, $\eta_{rel}=3.5$, nylon 4.6 of DSM, the Netherlands. Temperature of the melt 310° C., mold temperatures 60° C.

The test bars were given a heat treatment at 260° C. in a nitrogen atmosphere containing 10 vol. % water. Properties of the test bars determined at different time intervals are shown in Table 3.

TABLE 3

| | time (hrs) | $\eta_{rel}$ | $\Delta H_{m1}$ (J/g) | $\Delta H_{m2}$ (J/g) | $T_{m1}$ (°C.) | $T_{m2}$ (°C.) | IZOD Impact Resistance |
|---|---|---|---|---|---|---|---|
| Comp. Sample A | 0 | 3.4 | 78 | 81 | 290 | 288 | 10 |
| Sample 1 | 2 | 3.7 | 120 | 83 | 297 | 277 | |
| Sample 2 | 4 | 3.9 | 129 | 82 | 300 | 289 | 9.3 |
| Sample 3 | 20 | 4.5 | 152 | 84 | 311 | 288 | 7.7 |

In the FIGURE, the torsion pendulum modulus as a function of temperature for the Samples 1 and 3 is represented graphically. Comparative sample A and the data for a number of other injection molded thermoplastic materials are included in this FIGURE. The data for the other thermoplastic materials were obtained from H.M.J.C. Creemers, Kunststof en Rubber, March, 1985, p. 21-32, FIG. 1.

From this example, it is clear that the nylon 4.6 samples having high crystallinity according to the invention show an appreciable increase in torsion pendulum modulus compared to the sample A in which the first and second melting enthalphy are of the same order. The impact resistance is only slightly changed despite the very appreciable increase, nearly doubling, of the melting enthalpy. Further, it appears that the second melting enthalpy is nearly independent of the molecular weight ($\eta_{rel}$) of the nylon 4.6, which is also true for the second melting temperature.

Example V and Comparative Example IV

Example IV was repeated using however a glass fiber filled (30 wt. %) nylon 4.6 instead of STANYL TW300 ®.

As in Example IV, an article with very high crystallinity was obtained after four hours of heat treatment. The properties of the molded articles before and after that treatment are shown in Table 4.

TABLE 4

| | heat treatment | $\Delta H_{m1}$ (J/g) | $T_{m1}$ (°C.) | IZOD (kJ/m$^2$) | G' (250° C.) MPa |
|---|---|---|---|---|---|
| Comp. Ex. IV | 0 hrs. | 97 | 294 | 11 | $0.7 \times 10^3$ |
| Ex. V | 4 hrs. | 134 | 292 | 10 | $1 \times 10^3$ |

Although the stiffness of glass fiber filled articles is generally due to the filler material, a considerable increase in stiffness is observed (about 40%).

Example VI and Comparative Example V

Tubing with an outside diameter of 7 mm and wall thickness of 0.8 mm was extruded from polyamide 4.6, $\eta_{rel}=3.8$ (Cu stabilized). Part of the tubing received a heat treatment at 260° C. for 20 hours. The stiffness of the tubing was tested by placing a defined length of tubing between two parallel plates and measuring the displacement of the plates as a function of the force on the plates. A 40 Newton force was applied at a temperature of 25° C. and a 16 Newton force was applied at a temperature of 120° C. The results of these measurements are shown in Table 5.

TABLE 5

| | heat treatment | $\Delta H_{m2}$ (J/g) | $\Delta H_{m2}$ (J/g) | $T_{m1}$ (°C.) | $T_{m2}$ (°C.) | displacement (mm) | |
|---|---|---|---|---|---|---|---|
| | | | | | | 25° C. (40 N) | 120° C. (16 N) |
| Comp. Ex. V | 0 hrs | 78.4 | 80 | 286.6 | 288 | 0.19 | 0.34 |

TABLE 5-continued

| | heat treatment | $\Delta H_{m2}$ (J/g) | $\Delta H_{m2}$ (J/g) | $T_{m1}$ (°C.) | $T_{m2}$ (°C.) | displacement (mm) 25° C. (40 N) | 120° C. (16 N) |
|---|---|---|---|---|---|---|---|
| Ex. IV | 20 hrs | 157.6 | 82 | 310 | 289 | 0.15 | 0.18 |

It is clear from the foregoing results that the tubing with the polyamide 4.6 according to the invention has much improved mechanical properties, especially at elevated temperature.

Example VII and Comparative Example VI

Ball bearing cages, diameter about 6 cm, were injection molded from polyamide 4.6, $\eta_{rel}=3.3$, containing 30 wt. % glass fiber and a heat stabilizer. After injection molding, the ball bearing cages were subjected to a heat treatment at 260° C. for 20 hours. The mechanical properties were determined in the same manner as in the case of the tubing (Example VI).

The results are shown in Table 6.

TABLE 6

| | heat treatment | $\Delta H_{m1}$ (J/g) | $\Delta H_{m2}$ (J/g) | force (N) needed for 0.2 mm displacement 25° C. | 120° C. |
|---|---|---|---|---|---|
| Comp. Ex. VI | 0 hrs | 97.8 | | 5.6 | 2.4 |
| Ex. VII | 20 hrs | 153 | | 7.0 | 3.4 |

The above results show that also in the case of this glass fiberfilled article, an improvement in stiffness is observed.

Example VIII

Test bars of STANYL TW300 ® were melt processed, however the mold has been cooled at different cooling rates. After solidification and cooling down to a temperature of 100° C., the test bars were heated to 260° C. and kept at that temperature in a humid nitrogen atmosphere during a fixed period of time (2 hrs.). Crystallinity for the different samples was determined by DSC.

TABLE 7

| cooling rate (°C./min.) | $\Delta H_{m1}$ (J/g) |
|---|---|
| 5 | 98 |
| 40 | 106 |

TABLE 7-continued

| cooling rate (°C./min.) | $\Delta H_{m1}$ (J/g) |
|---|---|
| 160 | 153 |
| 320 | 157 |

It is clear that in the case of low cooling rates a much longer heat treatment is needed to obtain articles with the crystallinity of the present invention.

We claim:

1. A molded polyamide article consisting substantially of tetramethylene adipamide units, having a first melting enthalpy which is at least 30 Joules per gram higher than a second melting enthalpy determined after melting and subsequent solidification of the polyamide, the first melting enthalpy being determined on a sample of the molded article by differential scanning calorimetry (DSC), with a heating rate of 5° C. per minute, and the second melting enthalpy being determined after the molten polyamide has cooled at a rate of 5° C. per minute to below its crystallization temperature and after complete solidification is reheated at a heating rate of 5° C. per minute.

2. Molded polyamide article according to claim 1, wherein the first melting enthalpy is at least 45 Joules per gram higher than the second melting enthalpy determined after melting and subsequent solidification.

3. Molded polyamide article according to claim 1, wherein the relative viscosity ($\eta_{rel}$) of the polyamide is at least 2.0 when determined in a solution of 1.0 g polyamide in 100 ml of 96 wt. % sulfuric acid.

4. Molded polyamide article according to claim 2, wherein the relative viscosity ($\eta_{rel}$) of the polyamide is at least 2.0 when determined in a solution of 1.0 g polyamide in 100 ml of 96 wt. % sulfuric acid.

5. Molded polyamide article according to claim 1, wherein the IZOD impact resistance at 25° C. is at least 6 kJ/m² (dry as molded).

6. Molded polyamide article according to claim 2, wherein the IZOD impact resistance at 25° C. is at least 6 kJ/m² (dry as molded).

7. Molded polyamide article according to claim 3, wherein the IZOD impact resistance at 25° C. is at least 6 kJ/m² (dry as molded).

* * * * *